United States Patent [19]

Oki

[11] Patent Number: 4,622,798

[45] Date of Patent: Nov. 18, 1986

[54] SEALING MECHANISM FOR A PACKING MACHINE

[75] Inventor: Yasuo Oki, Tomioka, Japan

[73] Assignee: Orihiro Co., Ltd., Japan

[21] Appl. No.: 723,095

[22] Filed: Apr. 15, 1985

[30] Foreign Application Priority Data

Nov. 27, 1984 [JP] Japan .................... 59-178697[U]

[51] Int. Cl.⁴ .................. B65B 51/30; B65B 51/14
[52] U.S. Cl. ................................. 53/373; 53/551;
156/583.1; 74/106; 74/520
[58] Field of Search .............. 53/551, 552, 554, 555,
53/373; 74/106, 520, 600; 156/553, 583.1

[56] References Cited

U.S. PATENT DOCUMENTS 2,444,324  6/1948  Allen et al. .................... 74/600
3,159,955 12/1964  Thurlings ...................... 53/551
3,220,161 11/1965  Lohse et al. ................... 53/373
3,830,681  8/1974  Wilson ....................... 53/373 X
4,040,237  8/1977  O'Brien ........................ 53/551
4,265,074  5/1981  Reuter et al. .................. 53/551

Primary Examiner—Horace M. Culver
Attorney, Agent, or Firm—McGlew and Tuttle

[57] ABSTRACT

A low-to-high pressure, fusion-welding, press mechanism for vertical packing machines which seals packed products using packing film. The press mechanism comprises a cylinder, a cylinder rod, a circular disc, a plurality of pairs of levers and a pair of sealing substrates having a pair of sealing blades, these members being interconnected to each other to fusion-weld packed products with said pair of sealing blades under desired sealing pressure.

4 Claims, 3 Drawing Figures

SEALING MECHANISM FOR A PACKING MACHINE

FIELD OF THE INVENTION

The invention relates to a sealing mechanism for a packing machine and particularly to a low-to-high pressure, fusion-welding, press mechanism for sealing.

DESCRIPTION OF THE PRIOR ART

Conventionally, in the driving of sealing mechanisms in vertical sealing machines, press means for pressurized fusion-welding of film are basically constructed to use either a cylinder or cam-crank mechanism. When changing the required sealing pressure setting in the means using a cylinder, the air pressure, cylinder diameter or other functions are changed. On the other hand in the means using a cam-crank mechanism, the cam configuration or drive motor power is changed.

However, with the mechanisms mentioned above, it has become impossible to perfectly seal packed products using packing film which is available in many varieties recently. In other words, setting the sealing pressure depending on the film material has become very difficult.

Further, the above mechanisms of the prior art have the following disadvantages: First, in the cylinder-type means;

(a) A cylinder having a large diameter is necessary to raise the sealing pressure.

(b) Sealing of thick film is difficult within specified pressure limits.

(c) A high pressure supply source is required.

(d) A large space is required to allow for the large cylinder required.

(e) Costs increase.

(f) Parts wear excessively, thereby reducing machine operating time.

Second, in the means using a cam-crank mechanism:

(a) Strong construction is necessary.

(b) Design changes in construction are necessary in addition to changes in the drive motor power. (c) Design changes in construction bring about difficulty in manufacture of the machine, thereby increasing cost.

SUMMARY OF THE INVENTION

The invention has as its object to provide a sealing mechanism for vertical packing machines, wherein press pressure can be simply and widely adjusted without changing any machine mechanism. The mechanism can be adjusted for with pressure ranging from low to high and, in particular, the pressure can be increased almost without limit when a fusion-welding press of high pressure is required.

DETAILED DESCRIPTION OF THE INVENTION

According to the invention, a sealing mechanism for packing machines, comprises: a cylinder; a piston with rod extended and retracted by said cylinder; a circular disc rotatably supported by a central shaft at a predetermined position; a first lever which is supported at one end by said central shaft and at the other end rotatably connected to the end of said piston rod; a pair of second levers rotatably attached to said disc at diametrically opposite positions adjacent the peripheral portion thereof; a pair of third levers having a dogleg shape (bell crank type), each of which is pivotally supported at a predetermined position and at an intermediate portion thereof and at one end each third lever is rotatably connected to the end of each of said pair of second levers; a pair of fourth levers each of which is at one end rotatably connected to the other end of said third lever and at the other end rotatably connected to fifth and sixth levers; a pair of fifth levers each of which is at one end supported at a predetermined position and at the other end rotatably connected to said fourth lever and sixth levers; a pair of sealing substrates provided with a pair of sealing blades; and a pair of sixth levers each of which has at an intermediate portion thereof adjusting means and is at one end rotatably connected to said fourth and fifth levers and at the other end rotatably connected to each of said pair of sealing substrates.

The invention will next be described by way of an example with reference to the accompanying drawings.

Figure 1:
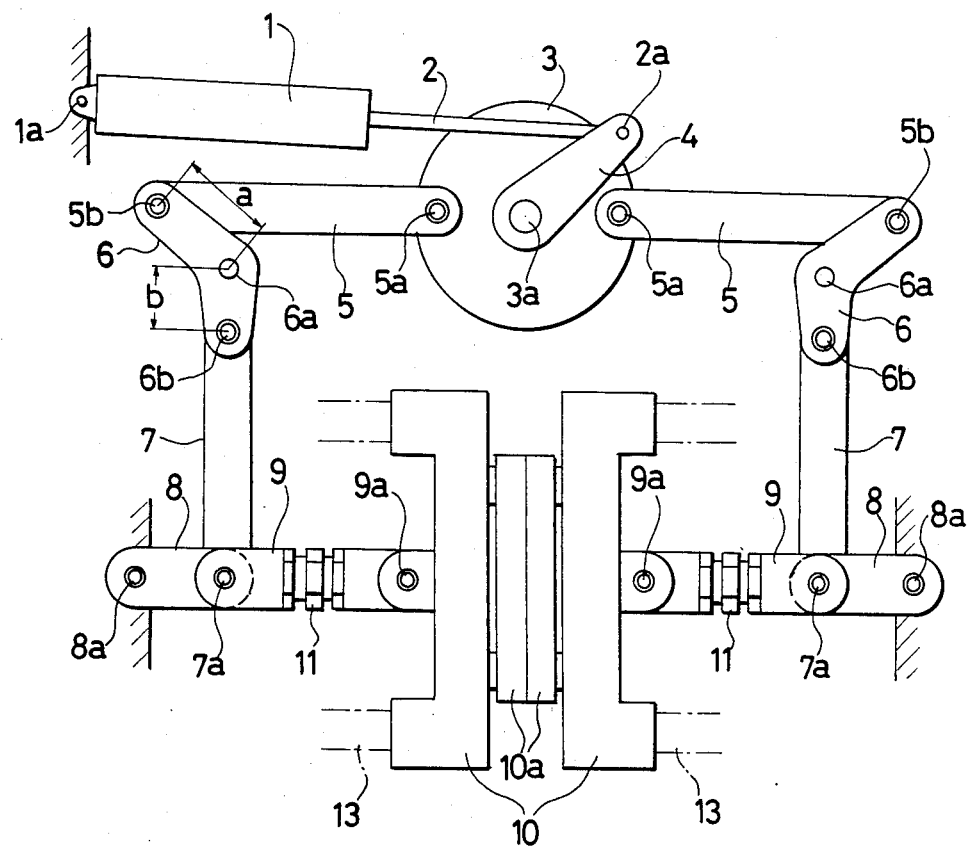
FIG. 1 is a plan view of an embodiment of the invention.

In FIG. 1, a cylinder 1 generally operated by high pressure air is at one end 1a rotatably supported at a predetermined fixed position and has at the other end a reciprocating piston rod 2. A circular disc 3 is rotatably supported by a central shaft 3a at a predetermined position. To the disc 3 is attached a first lever 4 which is at one end supported by the central shaft 3a and at the other end 2a rotatably connected to the cylinder rod 2. In other words, the disc 3 is rotated by pushing and pulling the first lever 4 by means of the cylinder rod 2. A pair of second levers 5,5 are at one end 5a,5a each rotatably attached to the disc 3 at diametrically opposite positions adjacent to the peripheral portion, and at other end 5b,5b each rotatably connected to third levers 6,6. Generally the pair of third levers 6,6 having a dogleg shape are in the intermediate portions 6a,6a at the predetermined positions pivotally supported and at the other ends 6b,6b each rotatably connected to one end of a pair of fourth levers 7,7. In each of the pair of third levers 6,6, the distance "a" between the intermediate portion 6a and one end 5b and the distance "b" between the intermediate portion 6a and the other end 6b are in the following relation: a>b. Levers 6, 6 are crank levers with their intermediate pivot portions 6a out of line with their ends 5b and 6b. A pair of fourth levers 7,7 are at their other ends 7a,7a each rotatably connected to a pair of fifth levers 8,8 and a pair of sixth levers 9,9 that are pivotally connected to each other at a joint connected to ends 7a, 7a of levers 7, 7. Each of the pair of first levers 8,8 is supported at a predetermined fixed position at the end 8a opposite the connecting end with the fourth lever 7. Each of a pair of sixth levers 9,9 is at the connecting portion 9a connected to each of a pair of sealing substrates 10,10 which are opposite each other. Each of the levers 9,9 is provided at its intermediate portion with an adjusting means 11 by which the overall length of the lever 9 is adjusted to regulate the engaging pressure between the pair of sealing substrates 10. Numerals 10a,10a indicate a pair of sealing blades for pressing, heating, fusion-welding and cutting operations at the time of sealing. A pair of sealing substrates 10,10 are guided by a pair of guiding means or tracks 13 so as to oppose each other. All of the fixed pivot connections such as 1a, 3a, 6a, and 8a and guide 13 are assumed to be on a fixed frame or support.

Figure 2A:
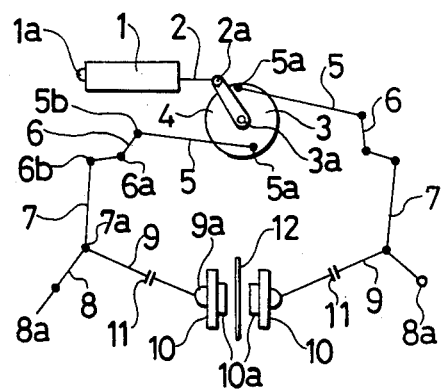
FIG. 2(A) and 2(B) are schematic diagrams illustrating the operation of the embodiment.
Figure 2B:
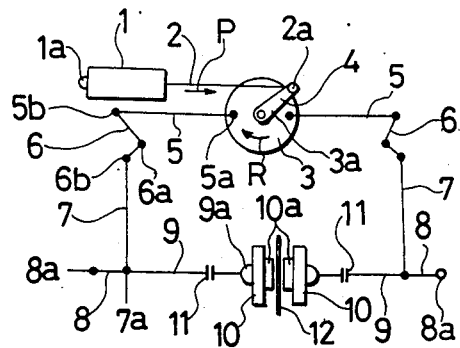

The operation of the mechanism will be described below with reference to FIG. 2(A) and (B). Prior to sealing, the cylinder rod 2 is at the retracted position in the cylinder 1, wherein the fifth and sixth levers 8,9 intersect at an angle at the position 7a (connecting point), the sealing substrates 10,10 and the sealing blades 10a,10a each being separated from each other. When film 12 for sealing is inserted between the sealing blades 10a, 10a, as shown in FIG. 2(B), the cylinder rod 2 projects from the cylinder 1 in the direction of arrow P to rotate the disc 3 in the direction of arrow R via the first lever 4 and central shaft 3a. Herein, the torque exerted on the second lever 5 by the lever 4 is enlarged. By the operation of the second lever 5, the third lever 6 pivots upon the intermediate portion 6a to push the fourth lever 7 down. Based on the relation a>b mentioned above in the third lever 6, the torque at the end 6b is enlarged, and the fourth lever 7 pushes down the point 7a where the fifth lever 5 and sixth lever 6 intersect at an angle so that the substrates 10,10 and the sealing blades 10a,10a are pressed against each other under magnified pressure to press and fusion-weld the film 12.

The pressure under which the substrate 10 and the sealing blade 10a are pressed can be adjusted by changing the overall length of the sixth lever 9 through the adjusting means 11.

According to the invention, sealing pressure can be changed without any need for changes in air pressure, diameter, or other functions of the cylinder, or without any need for a change in the drive motor power in a cam-crank mechanism. Sealing pressure can be adjusted through adjustment of pressure adjusting means simply and widely as required for fusion-welding under pressure ranging from low to high. Further, the device is compact in size, easy to adjust and inexpensive to manufacture.

As it will be understood that embodiments of the invention can be constructed in widely different modes without departure from the spirit and scope of the invention, the invention should not be limited to any specific mode or embodiment except as defined in the accompanying claims.

What is claimed is:

1. A sealing mechanism for a packing machine, comprising:
   a fixed support;
   a cylinder having one end pivotally mounted to said fixed support;
   a piston with piston rod extendable and retractable from an opposite end of said cylinder;
   a circular disc having a central shaft connected thereto, said central shaft being rotatably mounted to said fixed support for rotation of said circular disc;
   a first lever having one end fixed to said central shaft for pivoting of said lever with rotation of said central disc, said first lever having an opposite end pivotally connected to said piston rod;
   a pair of second levers each rotatably connected to said disc at diametrically opposite postions adjacent an outer periphery of said disc, each of said pair of second levers having outer ends extending outwardly and on opposite sides of said central shaft;
   a pair of third levers each having one end pivotally mounted to one of said outer ends of one of said second levers, each third lever having an opposite end, each third lever comprising a crank lever having an intermediate pivot portion intermediate its opposite ends, said intermediate pivot portion being out of line with said opposite ends of each third lever, each of said third levers being pivotally mounted at their intermediate pivot portion to said fixed support;
   a pair of fourth levers each having one end rotatably connected to said opposite end of one of said third levers, each of said fourth levers having an opposite end;
   a fifth pair of levers each having a first end pivotally connected to said fixed support at spaced apart locations on said fixed support, each fifth lever having an opposite end;
   a pair of fixed levers each having one end pivotally connected to one of said opposite ends of one of said fifth levers at a pivot joint joining said fifth and sixth levers together, each of said sixth levers having an opposite end spaced from said pivot joint;
   said opposite end of each of said fourth levers being connected to one of said pivot joints of said fifth and sixth levers;
   a pair of sealing substrates slidably mounted on said fixed support toward and away from each other, each sealing substrate being pivotally mounted to one opposite end of one of said sixth levers;
   each of said sixth levers having adjustment means intermediate its ends for adjusting a length of each sixth lever; and
   a pair of sealing blades each fixed to one of said sealing substrates, said sealing blades facing each other so that, with extension and retraction of said piston rod, said blades are moved toward and away from each other.

2. A sealing mechanism according to claim 1, wherein said intermediate pivot portion of each of said third levers are closer to each other than said one end of each of said third levers which are connected to said outer ends of said second levers.

3. A sealing mechanism according to claim 2, where a distance between said first end of each of said third levers and said intermediate pivot portion of each of said third levers is greater than the distance between said intermediate pivot portion of each of said third levers and said opposite end of each of said third levers.

4. A sealing mechanism according to claim 3, wherein said sealing substrates are mounted for linear parallel movement toward and away from each other, said portions of said fixed support on which said one ends of said fifth levers are mounted being spaced from each other parallel to said direction of movement of said sealing substrates.

* * * * *